E. C. MADARY.
TOBACCO MOISTENER.
APPLICATION FILED JAN. 25, 1909.

964,442.

Patented July 12, 1910.

Witnesses

Inventor
Edward C. Madary.
By C.A. Snow & Co.
Attorneys

UNITED STATES PATENT OFFICE.

EDWARD C. MADARY, OF TRAVERSE CITY, MICHIGAN.

TOBACCO-MOISTENER.

964,442.  Specification of Letters Patent.  Patented July 12, 1910.

Application filed January 25, 1909. Serial No. 474,116.

*To all whom it may concern:*

Be it known that I, EDWARD C. MADARY, a citizen of the United States, residing at Traverse City, in the county of Grand Traverse and State of Michigan, have invented a new and useful Tobacco-Moistener, of which the following is a specification.

The hereindescribed device is intended primarily, although not exclusively, to be mounted in show-cases and like receptacles, for the purpose of moistening tobacco therein contained.

The objects of the invention are, generally, the provision, in a merchantable form, of a device of the above mentioned class, which shall be inexpensive to manufacture, facile in operation, and devoid of complicated parts; specifically, the provision of a tank of novel and improved construction; the provision of novel means for heating the water or other liquid contained in the tank; the provision of novel means for controlling, automatically, the temperature of the liquid in the tank as it is raised by the heating means; other and further objects being made manifest hereinafter as the description of the invention progresses.

The invention consists in the novel construction and arrangement of parts hereinafter described, delineated in the accompanying drawings and particularly pointed out in that portion of the instrument wherein patentable novelty is claimed for certain distinctive features of the device, it being understood that, within the scope of what is hereinafter claimed, divers changes in the form, proportions, size and minor details of the structure may be made, without departing from the spirit or sacrificing any of the advantages of the invention.

Similar numerals of reference are employed to denote corresponding parts throughout the several figures of the drawings.

Figure 1:
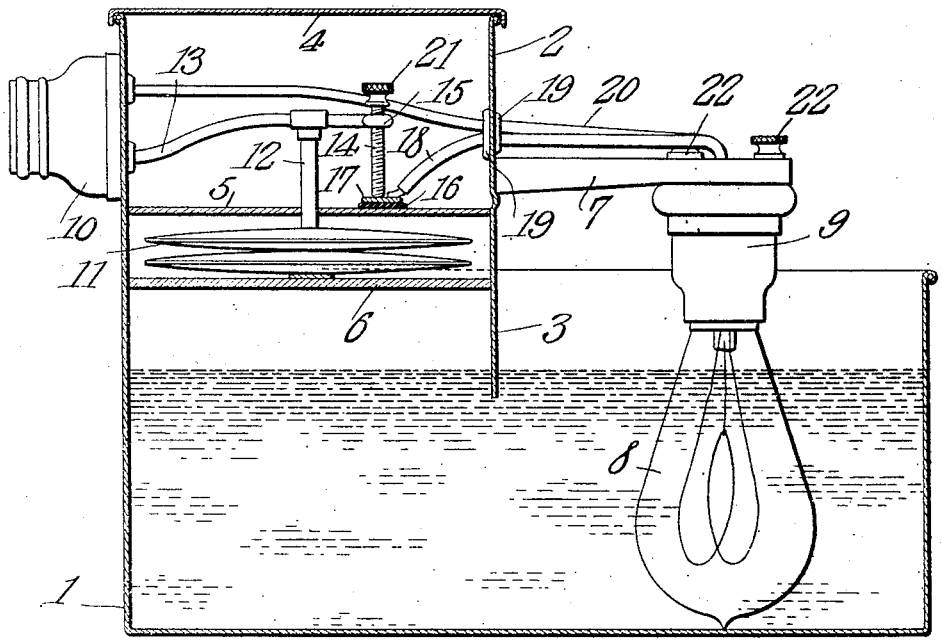
Figure 2:
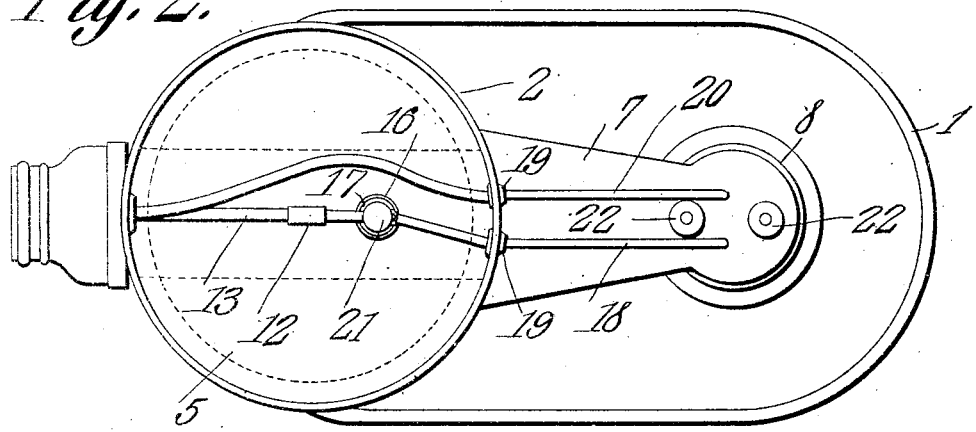

In the accompanying drawings:—Figure 1 shows my invention in vertical longitudinal section; Fig. 2 is a top plan thereof.

In carrying out my invention, I provide, primarily, a tank, denoted generally by the numeral 1 and open at the top. For convenience in cleaning the tank, and in order to provide an attractive structure, the ends of the tank 1 are rounded, and from one end rises the chamber 2, preferably circular in outline and of the same radius as the end of the tank 1. The side wall 3 of the chamber 2 is downwardly prolonged to extend into the tank 1, and the said chamber is suitably covered by a lid 4, which may be of any form.

The chamber 2 is provided with a transversely disposed flooring 5, which is coextensive with the chamber itself, and beneath the flooring 5 and spaced apart therefrom is a relatively narrow transversely disposed cross-piece 6. From the exterior of the chamber 2 a bracket 7 projects radially over the tank 1, and this bracket is provided at its outer terminal with a socket 9, designed to receive an ordinary incandescent lamp 8. The socket 9 may be assembled with the bracket 7 in any suitable manner; if desired, the socket may be provided with threaded lugs extending upward through the bracket 7, and arranged to receive thumb-nuts 22. Mounted on the chamber 2, upon its exterior and preferably near to the top of said chamber, is another socket 10, designed to receive a plug or other means whereby the device may be brought into an electrical circuit.

I further provide expansible disks 11, which are rigidly mounted upon the cross-piece 6. Rising from the disks 11 is a standard 12, arranged to reciprocate in an opening provided for its reception in the floor 5. Mounted in the upper terminal of the standard 12 is a conductor 13, one end of the same being operatively connected with the socket 10. The opposite terminal of the conductor 13 carries a flattened portion 15, said portion being provided with an interiorly threaded opening arranged to receive a threaded element 14, having a head 21, which, if desired, may be fashioned from any suitable insulating material. Mounted upon the flooring 5 is a suitable seat 16 of insulating material, a metallic contact 17 being superposed upon the seat 16. The conductor 18 unites the contact 17 with the lamp 8, and another conductor 20 leads from the lamp 8 through the chamber 2 to the socket 10, the said conductors 18 and 20 being surrounded by suitable insulating material 19 where they pass through the wall of the chamber 2.

The practical operation of my device is as follows:—The tank 1 is placed within a show-case or other receptacle, the air of which it is desired to humidify. The tank is then filled with water to a point well up on the globe of the lamp 8, the device being placed in an electrical circuit by means of the socket 10. The contacts 14 and 17 being together, the lamp is "turned on" in the usual manner. The temperature of the globe of the lamp will rise, and, as it rises, will heat the liquid in the tank 1 into which the globe of the lamp dips. As the temperature of the water in the tank 1 rises, it will throw off aqueous vapor of low tension, the air in the chamber 2 being heated at the same time. As the temperature of the air in the chamber 2 rises the temperature of the expansible disks 11 will rise, and they will expand, lifting the contact point 14 from the contact point 17 and breaking the circuit through the lamp 8. The temperature of the liquid in the tank 1 will then fall, and, as the disks 11 contract the contact point 14 will again be brought downward upon the contact point 17, relighting the lamp, whereupon the temperature of the liquid in the tank 1 will again rise, the proccess being repeated automatically.

By increasing the number of the lamps 8 and by varying their candle power, a tank of any size may be heated, and the air of a receptacle of any size humidified.

The threaded element 14 furnishes a means whereby the contact may be adjusted, and it will be seen that although the expansible disks 11 are so positioned as to respond quickly to any temperature changes in the tank, the conductors and the contact mechanism are located above the flooring 5 and disposed in a relatively dry compartment.

I have shown the chamber 2 as being provided with a lid 4, in order to protect the contact mechanism, but it is obvious that, if desired, thus lid 4 may be dispensed with entirely.

The contact points 14 and 17 may be fashioned from any material; platinum being preferred.

Having thus described my invention, what I claim as new, and desire to protect, by Letters Patent, is:—

A device of the class described comprising a tank having a chamber rising from one end thereof; a heating device arranged to dip into the tank; a floor located in the chamber and arranged to divide the chamber into separate compartments; an electric conductor operatively connected with the heating device and extending through the chamber above the floor, the conductor being broken within the chamber and having one of its terminals secured to the floor; expansible disks supported below the floor; a standard connected with one of the disks and arranged to reciprocate in the floor, the standard constituting a support for the other terminal of the conductor; and an adjustable contact carried by the last named terminal and adapted to bear on the floor supported terminal.

In testimony that I claim the foregoing as my own, I have hereto affixed my signature in the presence of two witnesses.

EDWARD C. MADARY.

Witnesses:
Z. W. TEETOR,
FRANK UMLOR.